United States Patent

[11] 3,605,021

[72] Inventor Eugene A. Mychalowych
Warren, Mich.
[21] Appl. No. 797,730
[22] Filed Feb. 10, 1969
[45] Patented Sept. 14, 1971
[73] Assignee Digital Techniques Corporation
Royal Oak, Mich.

[54] ACOUSTICAL COUPLER FOR FREQUENCY SHIFT TELEGRAPHIC SYSTEMS
13 Claims, 4 Drawing Figs.

[52] U.S. Cl. .......... 325/320, 178/66
[51] Int. Cl. .......... H04b 1/16
[50] Field of Search .......... 325/30, 163, 320; 178/66, 88

[56] References Cited
UNITED STATES PATENTS

| | | | |
|---|---|---|---|
| 3,095,542 | 6/1963 | Fusfield et al. | 330/109 |
| 3,172,953 | 3/1965 | Votaw | 178/88 |
| 3,414,827 | 12/1968 | Warburton | 178/88 |
| 3,507,997 | 4/1970 | Weitbrecht | 325/30 |

*Primary Examiner*—Richard Murray
*Assistant Examiner*—Anthony H. Handal
*Attorney*—Barnard, McGlynn & Reising

ABSTRACT: There is disclosed, in a data communication system, an acoustical coupler which enables the transmission of data over telephone lines through a conventional subscriber telephone set. The coupler serves to link or operably join an encoder-decoder, such as a teletypewriter set, with a telephone handset and thence the telephone lines. The coupler comprises a holder adapted to receive a telephone handset and includes a transmitter adapted to convert the mark and space signals of the encoder to frequency shift tone signals suitable for transmission. The coupler also includes a receiver adapted to convert tone frequency signals to mark and space signals for application to the decoder. The coupler is capable of operating in a full-duplex system, or if desired in a half-duplex system.

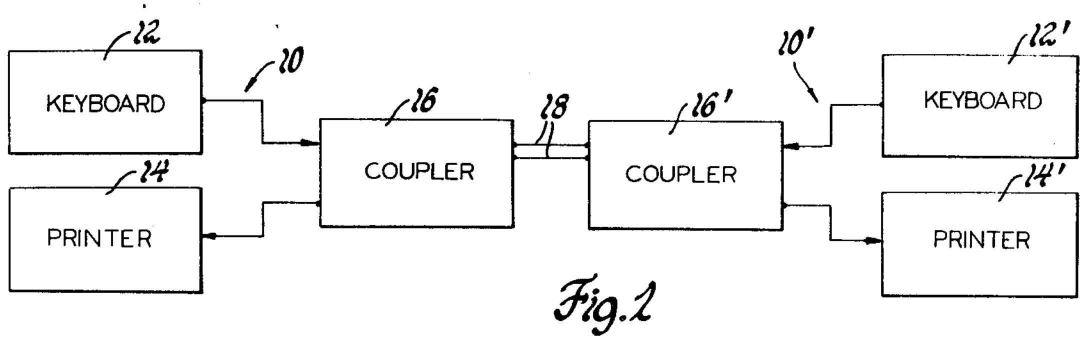
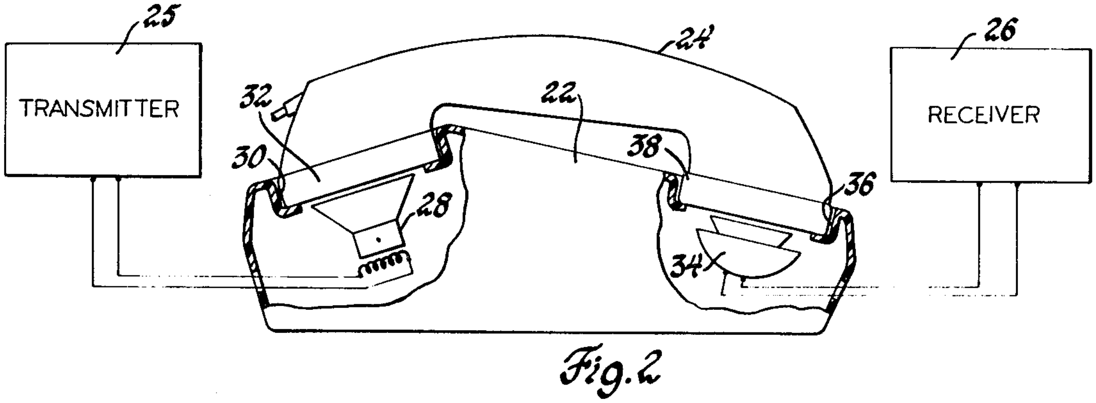
Fig. 2
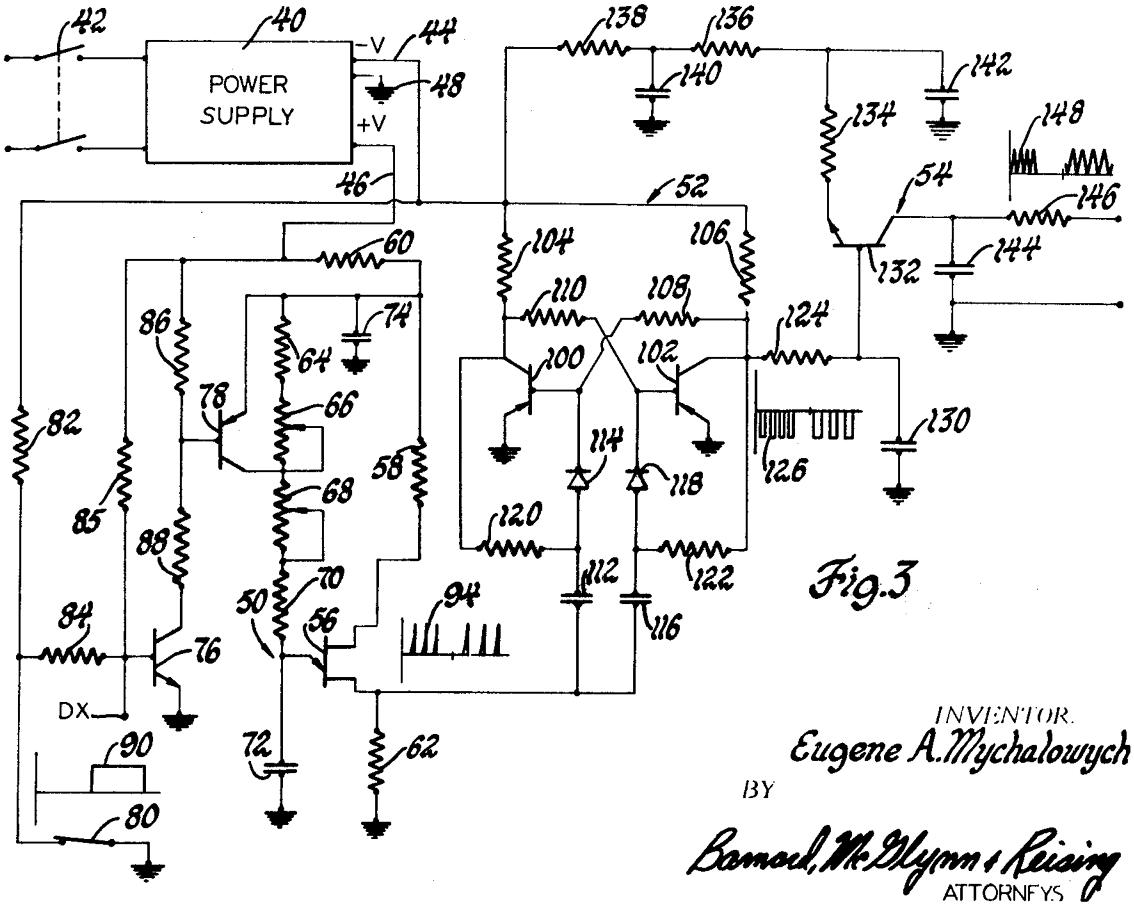
Fig. 3
INVENTOR.
Eugene A. Mychalowych
BY
Barnard, McGlynn & Reising
ATTORNEYS INVENTOR.
Eugene A. Mychalowych
BY
Barnard, McGlynn & Reising
ATTORNEYS

ACOUSTICAL COUPLER FOR FREQUENCY SHIFT TELEGRAPHIC SYSTEMS

This invention relates to data communication systems and more particularly to means for coupling a data transmission set to conventional telephone lines.

It is a common practice in the transmission of data to employ transmitting and receiving stations arranged to communicate by frequency shift signaling over a telephone switching network. Such systems are commonly called data sets or data transmission sets regardless of the particular form of encoder-decoder unit employed. Such data sets commonly use some form of printing telegraph, such as a teletypewriter, having a suitable keyboard input or encoder and a printer output or decoder. Such data sets may also be used to communicate directly with a digital computer wherein the data to be transmitted may be derived from a memory or storage medium. In such data transmission sets the information or data to be transmitted is represented by a suitable permutation code in binary form so that the characters are represented by a permutation of mark and space signals. The mark and space signals in the form of direct current impulses cannot be effectively transmitted over conventional telephone lines and accordingly it has become the practice to convert such signals into tone frequency signals at the transmitting unit and to reconvert them at the receiving unit. In such systems the encoder-decoder is operatively linked to the telephone network through a data set coupler which functions to convert mark and space signals from the encoder to tone frequency signals, and vice versa, so that the communication is carried out by a frequency shift-signaling system.

The data communication is carried out by means of conventional subscriber telephone sets. At the local station a call is originated by removing the handset from the cradle to place the line in an off-hook condition, and after receiving a dial tone from the central office the subscriber dials the digits of the remote subscriber set. The subscriber's set is placed in the originating mode so that transmission of frequency shift signals is accomplished in a first tone frequency band referred to as the F1 frequency band and receives signals in a second tone frequency band called the F2 frequency band. At the remote station when the call is received, the set is placed in the answer or terminating mode to transmit signals in the F2 band and receive signals in the F1 band. The local and remote stations are further conditioned for communication by exchange of supervisory or control signals and the communication of data signals proceeds.

It is an object of this invention to provide a coupler for use in data transmission systems which permits the connection of a data set to the conventional telephone lines through the conventional telephone handset, i.e., without the need for any electrical wiring connections. This is accomplished by using a handset holder adapted to receive a telephone handset with the transducers thereof coupled to corresponding transducers in the coupler which is provided with transmitter and receiver means adapted to convert mark and space signals in the form of direct current impulses to tone frequency signals and vice versa.

Another object of the invention is to provide an acoustical coupler for data sets which is capable of converting a binary signal represented by direct current impulses into tone frequency signals at a transmitting station, and reconverting the tone signals into binary signals at a receiving station without significant degradation of the signals or loss of intelligence in operation over the public telephone network, an inherently electrically noisy environment. This is accomplished by a frequency shift transmitter with its input connected with an encoder and operable to generate first and second tone frequencies in response to direct current encoder signals with the output coupled to a transmitting telephone handset and a receiver with its input connected to a receiving handset and having frequency responsive means providing a high degree of selectivity and an amplitude response corresponding to the first and second tone frequencies and means operative to produce decoder signals corresponding to the transmitted signal.

Another object of the invention is to provide a coupler for use in a data communication system for converting first and second tone frequency signals to mark and space signals respectively and being adapted for acoustical or inductive coupling through the telephone handset to the conventional telephone lines and with its output connected to a decoder, said coupler having a high degree of selectivity for the tone frequency signals with the capability of distinguishing the same from unwanted frequencies and electrical noise in the system.

It is a further object of the invention to provide a data set coupler which is of relatively small size and low cost, suitable for placement on a desk top, alongside a conventional telephone set and which may be used by unskilled operators. This is accomplished by using a handset holder or receptacle for the telephone handset and which encloses the transmitter and receiver circuits together with the power supply.

An additional object of the invention is to provide a data set coupler with a receiving circuit which provides a high degree of selectivity for first and second tone frequency signals. This is accomplished by a band-pass amplifier having a bandwidth with a center frequency adjacent the tone frequencies and a frequency selective means including a high Q parallel resonant network tuned to one of the tone frequencies with the frequency characteristic such that the amplitude response at the other of the tone frequencies is approximately one-half the peak response, thus permitting amplitude discrimination.

An additional object of the invention is to provide a data set coupler with a receiver which provides a high degree of selectivity so as to reject unwanted and spurious signals. This is provided by the use of a band-pass amplifier with negative feedback including a frequency selective means adapted to pass all frequencies above and below the pass band of the amplifier, such frequency selective means preferably taking the form of a twin-T notch filter. The selectivity is additionally enhanced by the use of an automatic gain control circuit which is responsive to voltages above a threshold value for regulating the gain of the amplifier and which is nonresponsive below the threshold value so that the rejection of frequencies outside the band pass of the amplifier is enhanced by the gain control.

An additional object of the invention is to provide a coupler for data sets for converting tone frequency signals to mark and space signals and which provide a stable output even in the absence of a received carrier wave whereby the decoder or printer connected with the output is prevented from chattering between the time power is applied to the coupler and the carrier is detected. This is accomplished by providing enabling means for rendering a decoder driver stage effective to hold the decoder in a mark condition when no carrier is received and to enable an amplitude discriminator to switch the driver stage when a mark or space signal is received.

An additional object of the invention is to provide a coupler for data sets with a highly selective receiver capable of responding to first and second tone frequency signals to produce mark and space signals, respectively, including a band-pass amplifier having a bandwidth with a center frequency adjacent the first and second tone frequencies, frequency selective means producing a peak amplitude response at one tone frequency and a reduced amplitude response at the other tone frequency, detector means connected with the frequency selective means and amplitude discriminating means adapted for switching a decoder driver which is operable to produce mark and space signals.

These and other objects of the invention and the manner in which they are accomplished will be set forth in greater detail in the description which follows taken with the accompanying drawings in which:

FIG. 1 is a block diagram of a data transmission system in which the inventive coupler may be employed;

FIG. 2 is a diagrammatic representation of the inventive coupler showing a conventional telephone handset in place thereon;

FIG. 3 is a schematic diagram of the transmitter circuit in the inventive coupler.

Figure 4:
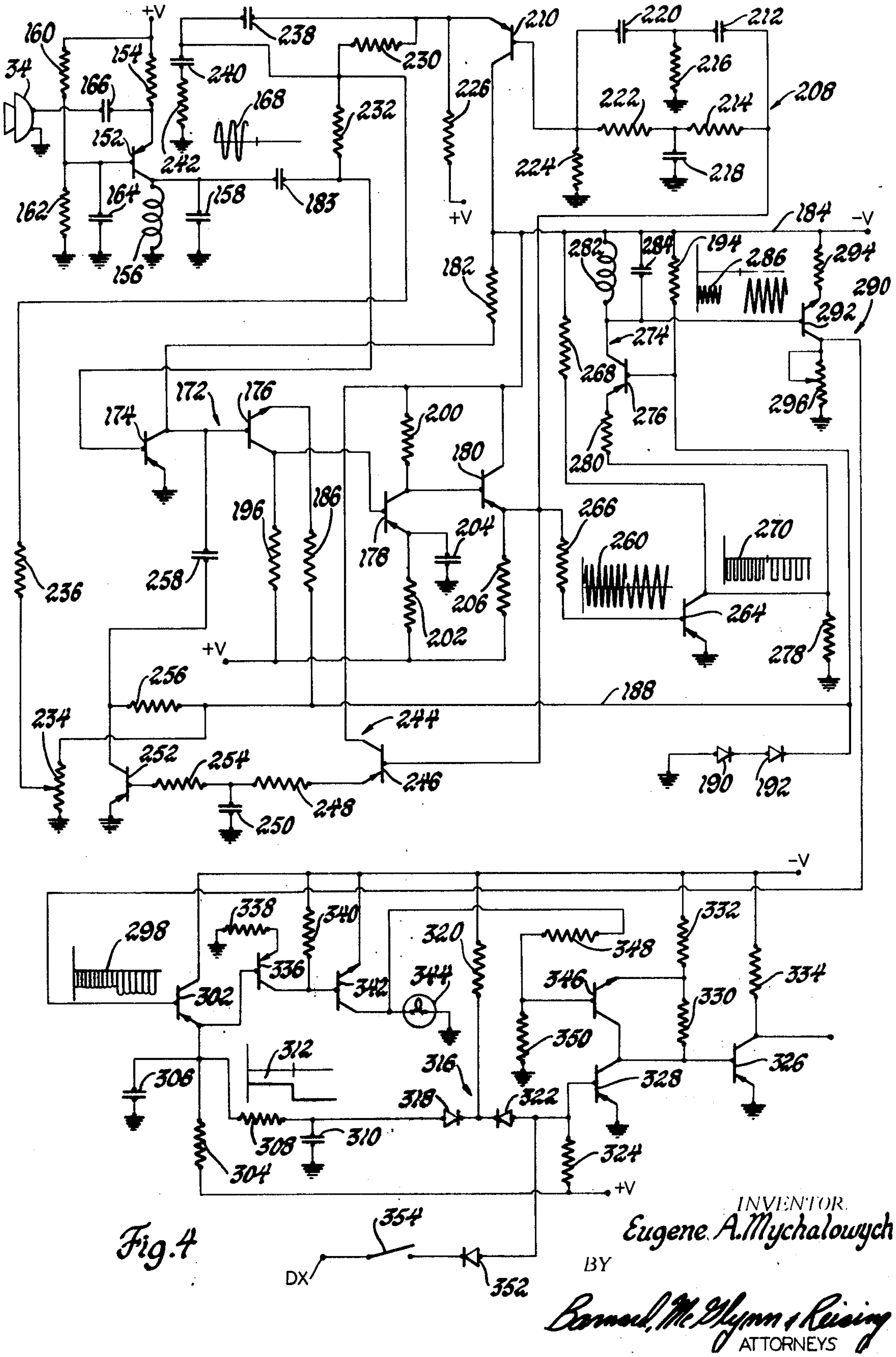
FIG. 4 is a schematic diagram of the receiver in the inventive coupler.

Referring now to FIG. 1, there is illustrated a data transmission system of the type adapted to transmit data signals over the conventional telephone network. In such a data transmission system the data is transmitted in binary form in accordance with a permutation code such as that commonly used in teletypewriter operation. The data is transmitted in a serial manner, with reference to bits and characters, and uses frequency shift keying as the method of modulation in converting mark and shift signals to tone frequency signals. For full duplex operation of this system, the available frequency spectrum of the telephone network, approximately 3 kHz. is utilized in accordance with an established convention. One tone frequency band, referred to as the F1 frequency band, is used for space and mark signals at 1,070 Hz. and 1,270 Hz., respectively, and the other tone frequency band, designated the F2 frequency band, is used for the space and mark signals at 2,025 Hz. and 2,225 Hz. respectively. By convention, the originating station always transmits in the F1 band and receives in the F2 band while the receiving station always transmits in the F2 band and receives in the F1 band. In the so-called half-duplex operation where, for example, the local station always originates the transmission, the same convention is followed and the local station transmits in the F1 band and receives in the F2 band.

In FIG. 1 the local station 10 and the remote station 10′ are provided with identical equipment which suitably comprises a conventional teletypewriter including an encoder or keyboard 12 and a decoder or printer 14. The output of the keyboard 12, in the form of mark and space signals represented by DC impulses of different levels, is applied to the input of the coupler 16. The output of the coupler 16 in the form of tone frequency signals is transmitted over the telephone network including the pair of lines 18 to the remote station 10′ wherein the tone frequency signals are applied through the coupler 16′ to the printer 14′. In the full-duplex operation the output of the keyboard 12′ at the remote station may be applied simultaneously through the coupler 16′ for transmission over the telephone network to the local station in which the tone frequency signals are converted by the coupler 16 to mark and space signals in the form of DC impulses and applied to the printer 14. For half-duplex operation, of course, the transmission may take place in one direction only from one coupler at a time.

As shown in FIG. 2 the coupler comprises a handset receptacle or holder 22 which is adapted to receive a conventional telephone handset 24 of a subscriber's telephone set connected into the telephone network. The coupler includes within the casing thereof a transmitter 25 and a receiver 26. The transmitter is connected to a speaker 28 the cone of which is positioned at the bottom of a recess 30 formed in the casing of the holder 22. The speaker 28 is acoustically coupled with the microphone 32 in the handset 24 and the recess 30 is suitably provided with acoustical insulation, not shown, to exclude ambient sounds and noise from the microphone 32. The receiver 26 is connected with a microphone 34 positioned at the bottom of a recess 36 formed in the casing of the holder 22. The recess 36 accepts the speaker 38 of the handset 24 for acoustical coupling with the microphone 34. The recess 36 is provided with suitable acoustical insulation, not shown, to eliminate unwanted sound from the microphone 34. Magnetic or inductive coupling means may be used in place of the microphone 34 to reproduce the signal in the speaker 38 for application to the receiver 26.

To simplify the description, the inventive data set coupler will be described with reference to application in a data set used only as an originating station. Thus, according to convention it will transmit in the F1 frequency band and receive in the F2 frequency band. Additionally, it will be assumed for purposes of the description, that the coupler will be used in a half-duplex operation. It will be apparent, however, to those skilled in the art that the coupler may be used equally well in a terminating station and in a full-duplex operation.

Referring now to FIG. 3, the transmitter 25 is shown in schematic diagram. The transmitter and receiver are both supplied with electrical power from a power supply 40 energized from the alternating current power lines through a power switch 42. The power supply provides a balanced or symmetrical output of direct current supply voltages with a negative DC supply voltage on conductor 44 and a positive DC supply voltage on conductor 46 both of which are returned to a point of reference potential or ground 48. The use of the balanced power supply is preferred in order to minimize the need for interstage capacitors and to increase stability of the circuits as a function of temperature. With the receiver operating from a balanced supply any power line variations will be reflected equally in the DC supply voltage levels and will have little effect on the coupler operation.

The transmitter is adapted to receive the mark and space signals from the teletypewriter keyboard output and produce tone frequency signals in response thereto suitable for transmission over a telephone network. The transmitter comprises a free running or relaxation oscillator 50, a wave shaping circuit, suitably in the form of a bistable multivibrator or flip-flop 52, and a driver stage 54. The relaxation oscillator 50 comprises a unijunction transistor 56 having its base-two connected to the positive supply voltage through resistors 58 and 60 and having its base-one connected through resistor 62 to ground. The emitter of the unijunction transistor is connected to a resistance-capacitance circuit which includes a fixed resistor 64, a potentiometer 66, a potentiometer 68 and a fixed resistor 70 in series with a capacitor 72. Additionally, a capacitor 74 is connected between the upper terminal of the resistor 64 and ground. The oscillator includes a switching circuit with transistors 76 and 78 and is responsive to the output of the teletypewriter keyboard for changing or shifting the frequency of the oscillator. The output switch 80 of the keyboard has one terminal connected to ground and the other terminal connected through a resistor 82 to the negative supply voltage. It is also connected to the base electrode of the transistor 76 through resistor 84 which is connected to the positive supply voltage through a resistor 85. The collector electrode of this transistor is connected to the positive supply voltage through resistors 86 and 88 and the emitter electrode thereof is connected directly to ground. Transistor 78 has its base electrode connected to the junction of of resistors 86 and 88 and its emitter to collector circuit is connected in parallel with the fixed resistor 64 and potentiometer 66 of the timing circuit of the relaxation oscillator.

The teletypewriter output switch 80 is normally in a grounded or mark state and in this condition the transistor 76 is forward biased into saturation. The collector current of transistor 76 through resistors 86 and 88 causes the base of transistor 78 to become negative with reference to the emitter and thus, this transistor is biased into saturation. Accordingly, the emitter to collector circuit of transistor 78 serves to short circuit the fixed resistor 64 and the potentiometer 66 in the timing circuit of the relaxation oscillator. Thus, with the teletypewriter switch 80 closed the input to the oscillator is at ground potential which corresponds to a mark signal as illustrated in the first time interval of the waveform diagram 90 adjacent switch 80. In this mark condition the oscillator frequency is F1M, i.e., the higher frequency in the F1 band. This output of the oscillator is developed across the load resistor 62 and is represented by the waveform diagram 92 adjacent the resistor 62. When the teletypewriter switch 80 is open, which corresponds to space signal, the voltage on the base electrode of transistor 76 becomes negative with reference to the emitter or ground and the transistor is cut off. This causes the base electrode of transistor 78 to become more positive and this transistor is cut off with the effect of connecting fixed resistor 64 and potentiometer 66 into the timing circuit of the oscillator. Thus, at the fixed contact of the teletypewriter switch 80, a space signal represented in waveform diagram 90 by the negative rectangular pulse during the second time interval is developed and the oscillator produces a lower frequency output F1S at the lower frequency of the F1 band, as indicated by the waveform diagram 94.

In order to produce a square wave signal train corresponding to the mark and space signal frequencies from the relaxation oscillator, the output thereof is applied to the input of the flip-flop or bistable multivibrator 52. The multivibrator comprises a pair of transistors 100 and 102 having their collector electrodes connected respectively through resistors 104 and 106 to the negative supply voltage and having their emitter electrodes connected directly to ground. The base electrode of transistor 100 is cross connected through resistor 108 to the collector electrode of transistor 102 and the base electrode of the latter is connected through resistor 110 to the collector electrode of transistor 100. The output of the oscillator 50 is applied to the input of the multivibrator 52 through the coupling capacitor 112 and steering diode 114 to the base of transistor 100 and also through the coupling capacitor 116 and steering diode 118 to the base electrode of transistor 102. To enhance the switching action of the transistors, a feedback resistor 120 is connected between the collector electrode of transistor 100 and the anode of the steering diode 114. Similarly, a resistor 122 is connected between the collector electrode of transistor 102 and the anode of the steering diode 118.

The output of the multivibrator 52 is taken from the collector electrode of transistor 102 and applied to the driver stage 54. The multivibrator is switched from one conductive state to the other with each succeeding impulse of the wavetrain from the oscillator. If it is assumed that transistor 100 is conductive and transistor 102 is cut off the output voltage is negative and an incoming positive pulse through the steering diode 114 will drive the base of transistor 100 positive thus initiating cut off action. Consequently, the base of transistor 102 begins to go more negative and the transistor becomes conductive. This decreases the voltage on the collector of transistor 102 toward ground which, through resistor 108, decreases the voltage on the base of transistor 100 and further reduces conduction thereof. Consequently, transistor 102 becomes fully conductive and transistor 100 is cut off. The output voltage at the collector of transistor 102 is thus reduced to zero, producing a rectangular output impulse. On the next input impulse the switching action causes transistor 100 to become fully conductive and transistor 102 to be cut off. Thus, it is seen that the output of the multivibrator 52 is a wave train of negative rectangular impulses having a pulse repetition frequency of one-half that of the input wave train from the oscillator. The mark signal which corresponds to the higher frequency of the F1 band is indicated by the first time interval of the waveform 126 and the space signal corresponding to the lower frequency of the F1 band is indicated by the second interval thereof.

The driver stage 54 provides driving current through the speaker 28 of the coupler corresponding to the tone signal frequencies which are developed by the multivibrator 52. It is desirably in this final stage to transform the rectangular wave shape of the multivibrator to a trapezoidal wave shape for application through the telephone handset 24 to the telephone lines. For this purpose the output of the multivibrator is supplied through a resistor 124 across an integrating or filter capacitory 130 with a relatively short time constant which rounds the edges and slows the rise time of the rectangular pulses. The driver stage 54 includes a transistor 132 which has its base electrode connected to the junction of the resistor 124 and the capacitor 130 and its emitter electrode connected through a resistor 134 to the negative supply voltage through a filter comprising series resistors 136 and 138 and shunt capacitors 140 and 142. This filter eliminates disturbances on the remainder of the stages which would otherwise result from the heavy current requirements of the driver stage. The collector electrode of the transistor 132 is connected to an integrating or filter capacitor 144 which has its other terminal connected to ground and is also connected to a resistor 146 which is connected to the speaker 28. It will be seen that each negative going impulse from the multivibrator output drives the transistor 132 toward cut off. It becomes conductive as the input becomes less negative and the capacitor 144 is effective to produce a trapezoidal waveform 148 across the output terminals and the speaker 28. The driver stage 54 is connected in a common base configuration and provides fault protection for the speaker in the event the speaker should be short circuited to ground. In this circuit configuration the current is limited by reason of the resistor 134 which limits the base drive current. Furthermore, isolation between the speaker and the multivibrator 52 is provided due to the power gain available from the common base configuration and, consequently, the current loading on the multivibrator is maintained at a low value permitting small components in the multivibrator.

The output from the transmitter which is coupled through the speaker 28 to the microphone 32 of the telephone handset 24 is applied therethrough to the telephone network and thence to the coupler of the remote station. Thus, the data signals from the teletypewriter keyboard are converted from the mark and space signals in the form of direct current impulses by the oscillator 50 to tone frequency signals which are suitably shaped by the multivibrator 52 and the driver stage 54.

The provision in the circuitry just described for suitable wave shaping of the tone frequency signal pulses is a significant factor in the operation of the overall system. It is to be noted that the output pulses as applied to the telephone transmission line are of a trapezoidal wave shape which, in the ideal case, has no second harmonic content. The elimination or substantial attenuation of the second harmonic component in the output pulses is significant because of the relationship between the F1 frequency band and the F2 frequency band and because of the side tone characteristics of the conventional telephone handset which purposely supplies a portion of the microphone signal to the speaker so that the user may hear his own voice through the speaker. The second harmonic frequency of the tone frequencies F1S and F1M are in close proximity to the tone signal frequencies F2S and F2M of the receiver. Consequently, the presence of a second harmonic component in the transmitted pulses produces distortion in the receiver with deleterious effects on the reliability of the system. As previously described, this wave shaping is accomplished by applying the output of the oscillator 50 through the multivibrator 52 to produce a square wave signal train corresponding to the mark and space signal frequencies; then applying this output to the driver amplifier 54 and thence to the integrating means including capacitor 144 to produce trapezoidal output pulses. For this purpose, the time constant of the integrating means, including capacitor 144 and its associated resistance, is long relative to the duration of each individual pulse but is short in relation to the duration of a mark or space signal. Consequently, the second harmonic component is substantially attenuated in each of the individual pulses of the pulse train.

Referring now to FIG. 4, the receiver circuits are illustrated in schematic diagram. Considering the coupler as being designed for use in the originate mode, the receiver is adapted to operate in the F2 band since the remote station will be transmitting in this band and receiving in the F1 band. The signals received through the telephone network will be applied in the form of tone frequency signals to the speaker 38 of the handset and thence to the coupler which includes (as illustrated in FIG. 2) the microphone 34 acoustically coupled thereto. As was previously noted, the signals from the speaker 38 of the handset 24 may be magnetically coupled to the receiver circuits instead of using an acoustical coupler as illustrated by the microphone 34. With reference now to FIG. 4, the microphone 34 is of the dynamic type and is connected through an input transistor 152 which provides appropriate impedance matching to the input of the receiver. The transistor 152 has its emitter electrode connected through a resistor 154 to the positive supply voltage and its collector electrode is connected to ground through a parallel connected inductor 156 and capacitor 158. A pair of voltage divider resistors 160 and 162 are connected between the positive supply voltage and ground and the junction thereof is connected to the base electrode of the transistor 152. A capacitor 164 is connected from the base electrode to ground. The microphone 34 has one terminal connected to ground and the other connected through a coupling capacitor 166 to the emitter electrode of transistor 152. The inductor 156 and the capacitor 158 are parallel resonant at a frequency midway between the tone frequency signals F2S and F2M. Consequently, the tone frequency signals are developed at the collector electrode of transistor 152 with a substantially sinusoidal waveform 168 of a frequency corresponding to either a space signal of a mark signal.

The tone signal is applied through the coupling stage to the input of a band-pass amplifier 172 which comprises transistors 174, 176, 178 and 180. The signal is applied to the base of transistor 174 through a blocking capacitor 183 which serves to block DC and undesired low frequency noise. The input stage including transistor 174 is a grounded emitter amplifier both for AC and DC signals and provides a large signal gain. Transistor 174 has its collector electrode connected through a resistor 182 to the negative supply voltage on a conductor 184 and has its emitter electrode connected directly to ground. The output of transistor 174 taken on its collector electrode is applied to the base electrode of transistor 176 which is connected in a grounded emitter configuration to obtain maximum current gain. The emitter electrode of transistor 176 is connected through a resistor 186 to a regulated voltage developed on conductor 188 across a pair of semiconductor diodes 190 and 192 which are connected in series with a voltage dividing resistor 194 between the negative supply voltage on conductor 184 and ground. The collector of transistor 176 is connected through a resistor 196 to the positive supply voltage. The output of transistor 176 is derived at the collector electrode thereof and applied to the base electrode of transistor 178 which is also connected in a grounded emitter configuration to provide maximum current gain. The collector electrode of transistor 178 is connected through a resistor 200 to the negative supply voltage on conductor 184 and the emitter electrode is connected through a resistor 202 to the positive supply voltage. The emitter of transistor 178 is bypassed to ground through a capacitor 204 which causes the gain of the stage to decrease for low frequency components because of the higher impedance presented to the emitter. The output of the transistor 178 is applied from the collector electrode thereof to the base electrode of the transistor 180 which is connected as an emitter follower to provide impedance matching to the subsequent stages. The transistor 180 has its collector electrode connected directly to the negative supply voltage through conductor 184 and has its emitter electrode connected through a resistor 206 to the positive supply voltage.

The band-pass amplifier 172 is provided with an exceedingly high degree of selectivity by means of a frequency selective degenerative feedback. The feedback path is provided from the output of the transistor 180, taken on the emitter electrode thereof, through a twin-T notch filter 208 to the input of transistor 210. The twin-T filter 208 has an input arm comprising a capacitor 212 and a resistor 214 with the junction thereof connected to the emitter of transistor 180. The filter has an intermediate or shunt arm including a resistor 216 and a capacitor 218 connected respectively from capacitor 212 and resistor 214 to ground. The filter also has an output arm including capacitor 220 and a resistor 222 with the output taken from the junction thereof nd applied across a shunt resistor 224 and thence to the base electrode of the transistor 210. The transistor 210 has its collector electrode connected directly to the negative supply voltage or conductor 184 and has its emitter electrode connected through a resistor 226 to the positive supply voltage. The feedback path is completed from the emitter electrode of transistor 210 through resistors 230 and 232 to the base electrode of transistor 174. These resistors 230 and 232 close the DC feedback loop and they also provide a junction point to provide an offset current to the summing node of transistor 174 from the potentiometer 234 connected across the regulated voltage on conductor 188. For this purpose the potentiometer 234 has its movable contact connected through a resistor 236 to the junction of resistors 230 and 232. The potentiometer 234 is used to adjust the DC output voltage of the transistor 180 at a desired level. The frequency response of the feedback loop and the band-pass amplifier are further established by a capacitor 238 connected across resistor 230 and a capacitor 240 connected in series with a resistor 242 between the junction of resistor 230 and 232 and ground. This resistance-capacitance network serves to reduce high frequency noise in the amplifier and also adds phase correction at high frequencies for closed loop stability.

The band-pass amplifier 172 is provided with an automatic gain control circuit 144 which is effective to maintain the AC voltage output of the amplifier at a substantially constant value and, in conjunction with the frequency selectivity provided by the negative feedback network, tends to eliminate undesired frequency components. The automatic gain control circuit includes a transistor 246 which serves as a threshold detector and a current amplifier. This transistor has its base electrode connected to the output of transistor 180 at the emitter electrode thereof and its emitter electrode is connected through a resistor 248 and a capacitor 250 to ground. The collector electrode of transistor 246 is connected to the negative supply voltage on conductor 184. The automatic gain control circuit also includes a transistor 252 with its base electrode connected through the resistor 254 to the junction of capacitor 250 and resistor 248 and with its emitter electrode connected directly to ground. The collector electrode of the transistor 252 is connected through a resistor 256 to the regulated voltage on conductor 188 and is also connected through a coupling capacitor 258 to the collector electrode of the transistor 174 in the band-pass amplifier. The transistor 246 serves to detect when the negative voltages at the output of the band-pass amplifier has exceeded a certain threshold voltage value and is biased in the forward direction when the threshold voltage value is exceeded. When this occurs the emitter to collector circuit of transistor 246 becomes conductive and the capacitor 250 becomes charged. As the voltage across the capacitor 250 increases negatively and transistor 252 is increasingly biased into conduction and hence its effective collector resistance begins to decrease as seen by the collector of transistor 174 through the capacitor 258. In this conductive condition of transistor 252 a portion of the output of transistor 174 is shorted out and thus the amplifier gain is reduced. If the output of the band-pass amplifier should drop below a predetermined voltage value but remain above the threshold voltage value, then the negative voltage across the capacitor 250 is decreased and the transistor 252 becomes less conductive. Consequently, it decreases the loading on the output of transistor 174 and the gain of the band-pass amplifier is increased. As a result of the action of the automatic gain control circuit, the output voltage of the band-pass amplifier 172 is maintained at a substantially constant value. Furthermore, those frequency components that are removed from the band-pass frequencies of the amplifier are attenuated substantially as a result of the frequency selective negative feedback so that those components which do not exceed the threshold voltage value at the output of the amplifier are further attenuated. The output of the band-pass amplifier 172 is a substantially sine wave voltage of constant amplitude and of a frequency corresponding to a mark or space signal as represented by waveform 260.

The output of the band-pass amplifier is applied to a signal standardizer or squaring circuit comprising a transistor 264 with its base electrode connected through a resistor 266 to the emitter electrode of transistor 180. Transistor 264 has its emitter electrode connected directly to ground and its collector electrode connected through a resistor 268 to the negative voltage supply on conductor 184. The transistor 264 is back-biased by a small positive voltage on the base electrode thereof which is the quiescent DC output voltage at the emitter of transistor 180 in the band-pass amplifier. This quiescent DC output voltage is adjusted in magnitude by the potentiometer resistor 234 previously referred to. The transistor 264 thus operates as a threshold detector and becomes conductive on the negative swings of the voltage applied to the base electrode. The operation of the transistor 264 as a threshold detector further provides for the rejection of any frequency components outside the pass band of the amplifier 172. The transistor 264 is driven into saturation on negative swing of the input voltage and, consequently, a rectangular or square output waveform 270 is produced.

The output of the transistor 264 is applied to the input of the frequency selective stage 274 including a transistor 276. This frequency selective stage is adapted to produce an output voltage amplitude corresponding to the tone frequency of either a mark or space signal applied to the input thereof. The output of the transistor 264 is applied across a resistor 278 to ground and through a resistor 280 to the emitter electrode of the transistor 276. The base electrode of this transistor is held at a constant voltage by connection to the regulated voltage on conductor 188. The collector electrode of transistor 276 is connected to the negative supply voltage on conductor 184 through a frequency selective network comprising an inductor 282 and a capacitor 284 connected in parallel. This frequency selective network is a parallel resonant circuit having a high Q and being tuned to the space frequency of the tone signals. In the frequency selective stage 274 the parallel resonant circuit is driven by the transistor 276 which is controlled by an input signal of substantially constant amplitude and having a frequency corresponding to the mark signal or the space signal as represented by the waveform 270. Consequently, the parallel resonant circuit is energized from a substantially constant current course which is, in effect, frequency modulated at the tone frequencies corresponding to space and mark signals. Therefore, the output of the parallel resonant circuit, as indicated in waveform 286, is a frequency dependent voltage which has a peak amplitude response at the space frequency and which has a reduced amplitude response at the mark frequency, the reduced response being about one-half of the peak response.

The output of the frequency selective stage 274 is applied to the input of a detector stage 290 which comprises a transistor 292 having its base electrode connected to the collector electrode of the transistor 276. The emitter electrode of the transistor 292 is connected through a resistor 294 to the negative supply voltage on conductor 184 and the collector electrode thereof is connected through a variable resistor 296 to ground. Thus, the transistor 292 is connected as an emitter follower which bridges the resonant circuit with a high impedance to the following stage to avoid loading of the parallel resonant circuit. The transistor 292 also functions as a half-wave detector with gain. On the more positive excursions of the input voltage, the transistor 292 is forward biased and the output voltage at the collector thereof is a half-wave rectified negative going voltage with a pulse frequency corresponding to a mark or space signal as represented in waveform 298. The detector stage 290 also includes a transistor 302 having the base electrode thereof connected to the collector electrode of the transistor 292. The collector electrode of the transistor 302 is connected directly to the negative supply voltage and the emitter electrode is connected through a resistor 304 to the positive supply voltage, A filter capacitor 306 is connected between the emitter electrode and ground and additional filtering is provided by a series resistor 308 and shunt capacitor 310. Accordingly, the output voltage across the capacitor 310, indicated by the waveform 312 is a direct current envelope voltage corresponding to the input signals. The lower amplitude detector output signal corresponds to a mark signal and the higher amplitude corresponds to a space signal. It is noted that the amplitude of the output signal from transistor 302 is substantially independent of power supply fluctuations since the parallel resonant circuit is driven from a current source whose voltage reference is derived from the regulated voltage of conductor 188.

The output of the detector stage 290 is applied to the input of an amplitude discriminator 316. The amplitude discriminator is adapted to switch from one conductive state to another when the input voltage increases beyond a predetermined value and to switch back when the input voltage decreases below the predetermined value. The amplitude discriminator comprises a first diode 318 having its anode connected to the junction of resistor 308 and capacitor 310 and its cathode connected through a resistor 320 to the negative supply voltage. The discriminator also includes a second diode 322 having its anode connected through a resistor 324 to the positive supply voltage and having its cathode connected through the resistor 320 to the negative supply voltage. The value of resistor 324 is related to the combined values of resistor 304 and 308 so that in the absence of any input signal the voltage on the anode of diode 318 is somewhat more positive than the voltage on the anode of diode 322. Hence, in the quiescent or no signal condition, the diode 318 is conductive in the forward direction and, consequently, by virtue of the voltage drop across the resistor 320 the diode 322 is maintained in a nonconductive condition. This bias condition on the diode-switching circuits including diodes 318 and 322 is further adjusted so that in the presence of a signal such as a negative voltage corresponding to a mark signal, the diode 318 remains conductive and the diode 322 remains cut off. As the negative voltage is increased to a predetermined amplitude, intermediate the values corresponding to the mark and space signals from the detector stage 290, the anode of the diode 318 becomes sufficiently negative that the diode is rendered nonconductive. Consequently, the diode 322 becomes forward biased and becomes conductive through resistors 324 and 320, thus signifying a space signal. When the input voltage to the amplitude discriminator decreases below the predetermined value, the anode of 318 again becomes sufficiently positive for forward conduction and the diode 322 is cut off, thus signifying a mark signal. Thus, it is seen that in the absence of an input signal and in the presence of a mark signal, the diode 318 is conductive and the diode 322 is cut off. On the other hand, in the presence of a space signal the diode 318 is cut off and the diode 322 is conductive. The output of the amplitude discriminator is taken from the anode of the diode 322 or across the resistor 324.

The output of the amplitude discriminator 316 is employed to control the switching of a decoder or printer-driver stage which comprises a transistor 326. The transistor 326 is controlled through a switching transistor 328 which has its base electrode connected to the junction of resistor 324 and diode 322 and has its emitter electrode connected directly to ground. Its collector electrode is connected through resistors 330 and 332 to the negative supply voltage. With this bias arrangement the transistor 328 is cut off when the diode 322 is nonconductive since the base electrode is held at a positive potential. Thus, for either a mark signal or in the absence of an incoming carrier signal, the transistor 328 is cut off. In the driver stage the transistor 326 has its base electrode connected to the collector electrode of transistor 328, its emitter electrode connected through a resistor 334 to the negative supply voltage. The transistor 326 is thus forward biased through the resistors 330 and 332 and is conductive, when the transistor 328 is nonconductive, i.e., in the absence of a signal or in the presence of a mark signal. Consequently, the output taken on the collector electrode of transistor 326 for the printer is at ground potential in the presence of a mark signal or in the absence of an input carrier.

In order to provide for switching of the driver stage to a nonconductive state in response to a space signal and to indicate the presence of a carrier a mark detecting circuit is provided. The circuit is connected to the output of detector 290 and comprises a transistor 336 having its base electrode connected directly to the emitter electrode of the transistor 302. Its emitter electrode is connected through a resistor 338 to ground and its collector electrode is connected through a resistor 340 to the negative supply voltage. When the output voltage of the detector is below a predetermined value corresponding to a mark signal the base of transistor 336 is held at a sufficiently positive voltage so that the transistor 336 is fully cut off. The output thereof is connected to a transistor 342 at its base electrode with its emitter electrode connected directly to the negative supply voltage and its collector electrode connected through a carrier indicator lamp 344 to ground. It is apparent that when transistor 336 is cut off transistor 342 is also cut off. The output of the transistor 342 taken on the collector electrode thereof is applied to the input of an enabling circuit including transistor 346 through a pair of voltage divider resistors 348 and 350. Thus, when transistor 342 is nonconductive, as in the absence of a carrier signal, the transistor 346 is forward biased through resistor 350, base electrode to emitter electrode and the resistor 332 to the negative supply voltage. Consequently, transistor 346 is fully conductive and provides a short circuit path around a resistor 330. Thus, in the quiescent or no signal condition the transistor 326 is forward biased from the emitter to base through the transistor 346 and the resistor 332 to the negative supply voltage and the transistor 326 is fully conductive. Accordingly the output taken at the collector of the transistor 326 is maintained at ground potential and is effective in the absence of a signal with the system energized to keep the decoder or printer form chattering. When a carrier is received the mark detecting circuit, including transistor 336 and 342, becomes conductive since the emitter of transistor 302 is sufficiently negative to permit forward bias of transistor 336. This in turn switches the transistor 342 into saturation and the carrier indicator lamp 344 in the collector circuit of the transistor 342 is energized. With the transistor 342 conductive the voltage developed across the voltage divider resistors 350 and 348 at the base of the transistor 346 in the enabling circuit is sufficiently negative to render this transistor nonconductive. Accordingly, the resistor 330 is effectively connected in the collector circuit of the transistor 328 and the base circuit of transistor 326. This reduces the forward bias on the transistor 326 and enables the output of switching transistor 328 to cut off transistor 326 when the switching transistor conducts in response to a space signal.

When a mark signal is received and the amplitude discriminator 316 is in a state with the diode 318 conductive and the diode 322 cut off, the transistor 328 is also cut off. Thus, transistor 326 is fully conductive signifying a mark signal as previously mentioned. Upon receipt of a space signal the amplitude discriminator 316 changes state and diode 322 becomes conductive. Accordingly, transistor 328 becomes forward biased and is conductive in its collector circuit through the resistor 330 and the resistor 332. With the resistor 330 in the circuit as previously described, the forward bias current through the transistor 326 is sufficiently reduced so that the conduction of transistor 328 through the resistor 330 develops a sufficiently positive voltage at the base of transistor 326 to cut off this transistor. Accordingly, the output taken at the collector electrode of transistor 326 is a negative voltage corresponding to a space signal.

When the data communication system is operated in the half-duplex mode, it is desirable to have the data being transmitted by the local station simultaneously reproduced by the local printer. For this purpose the input of switching transistor 328 is connected through a diode 352 and a selector switch 354 in a circuit connecting the transmitter to a point designated DX. The point DX is at the input of the transistor 76 in the transmitter and thus the input signal from the teletypewriter keyboard is applied directly to the input of the transistor 328 in the receiver. Thus, with the switch 354 closed for half-duplex operation, the decoder driver stage is driven directly by the keyboard output.

The operation of the overall system will now be summarized, reference being made to the description of the individual stages of the transmitter and receiver for detailed discussion of the operation. As previously mentioned, it will be assumed that the coupler will be operated in a half-duplex system at the originating station. Accordingly, it will transmit in the F1 frequency band and it will receive in the F2 frequency band. To initiate data transmission the power switch 42 is closed and the call to the remote station is placed by using the subscriber telephone set and dialing the digits of the remote station in the usual manner. The telephone handset 24 is then placed in the handset holder 22 as illustrated in FIG. 2.

The keyboard input to the transmitter, as illustrated in FIG. 3, is a mark signal with the keyboard output switch 80 closed and is a space signal with the switch open. The mark and space signals at this point are represented by direct current impulses as indicated in the waveform 90 wherein the mark signal is represented by the zero or ground voltage level and the space signal is represented by a positive voltage level. When the input is in mark signal the oscillator 50 produces an output voltage at the F1M frequency and when the input is a space signal the oscillator produces an output of lower frequency corresponding to the F1S frequency. The output of the oscillator 50 is represented by the waveform 94 and is applied to the input of the multivibrator 52. The multivibrator produces an output of rectangular wave shape at a frequency corresponding to the input and is represented by the waveform 126. The rectangular impulses of the multivibrator are applied to the speaker driver stage 54 and are wave-shaped to form trapezoidal pulses suitable for application to the telephone lines as represented by the waveform 148.

The receiver, as illustrated in FIG. 4, is adapted to receive the tone frequency signals from the telephone lines in the F2 frequency band. The tone frequency signals in the telephone handset are acoustically coupled to the microphone 34 and applied through an impedance matching stage, including transistor 152, to the input of the band-pass amplifier 172. The input to the amplifier 172, as illustrated in waveform 168, is a signal voltage of substantially sinusoidal waveshape and of a tone frequency F2M or F2S corresponding to the mark and space signals. The band-pass amplifier 172, in addition to providing voltage and current gain, provides a high degree of selectivity for the tone signals in the F2 band. The amplifier includes a degenerative feedback path including a twin-T notch filter 208 which has a center frequency between the frequencies F2M and F2S and thus rejects the frequencies desired in the pass band of the amplifier. The amplifier also includes an automatic gain control circuit 244 which is effective above a predetermined threshold voltage output to control the gain of the amplifier and maintain a substantially constant output voltage thereof. Accordingly, the amplifier strongly attenuates the undesired frequency components and passes the tone frequency signals F2M and F2S as represented by the waveform 260. The output of the amplifier is applied to a signal standardizing or squaring stage including transistor 264, which produces a wavetrain of rectangular impulses having a frequency corresponding to the mark and space signals as the case may be. The rectangular wavetrain is applied to the input of a frequency selective network 274 which includes a parallel resonant circuit tuned to the space frequency F2S and which is energized with constant amplitude current impulses with a frequency corresponding to the mark and space signals. Accordingly, the output thereof has am amplitude dependent upon the frequency of the input impulses and as indicated in waveform 286, the amplitude of the wavetrain corresponding to a mark signal is about one-half the amplitude of that corresponding to a space signal. This output is applied to a detector stage 290 including transistors 292 and 302 and is effective to recover the envelope of the signal as indicated in waveform 312. The detector output is applied to the input of an amplitude discriminator 316 which is maintained in one state of conduction, i.e., with diode 318 conductive and diode 322 cut off, when the detector signal is less than a predetermined amplitude. The amplitude discriminator is switched to its other state of conduction, i.e., with diode 322 conductive and diode 318 cut off, when the detector output exceeds the predetermined value. The predetermined value referred to is intermediate the values corresponding to the mark and space signals and is adjusted by potentiometer 296. Thus for a mark signal, and in the absence of a carrier, the amplitude discriminator is in its first state, whereas for a space signal the amplitude discriminator is in its second state of conduction. The output of the amplitude discriminator is applied through a switching transistor 328 to the decoder driver including transistor 326. The decoder driver is fully conductive in the presence of a mark signal or in the absence of a carrier and thus the output thereof which is connected to the teletypewriter printer is maintained at ground potential. The mark detecting circuit and carrier indicator circuit comprising transistors 336 and 342 has its input connected with the output of the detector stage 290. Both transistors 336 and 342 are nonconductive in the absence of a carrier and, consequently, the carrier indicator lamp 344 is not energized. For this condition the enabling circuit, including transistor 346, is fully conductive. When a mark or space signal is received, the mark detecting circuit changes state with transistors 336 and 342 becoming conductive and the lamp 344 is energized. The transistor 346 is cut off and the resistor 330 is effectively connected in the input circuit of transistor 326. If the received signal is a mark signal, the transistor 328 remains cut off, as previously described, and the decoder driver transistor 326 is fully conductive to maintain the output terminal at ground potential. When a space signal is received the amplitude discriminator changes state and the transistor 328 becomes conductive and by reason of resistor 330 which changes the bias condition on transistor 326, the conduction of transistor 328 is enabled to cut off the transistor 326. Accordingly, a transistor 326 produces a negative output voltage corresponding to a space signal.

Although the description of this invention has been given with reference to a particular embodiment, it is not to be construed in a limiting sense upon the scope of the invention. Many variations and modifications will now occur to those skilled in the art. For a definition of the scope of the invention, reference is made to the appended claims.

The embodiments of the invention in which an exclusive property or privilege is claimed are defined as follows:

1. For use in a data communication system wherein data signals are transmitted as tone frequency signals over telephone lines to a decoder adapted to respond to mark and space signals in the form of direct current impulses, a coupler for converting first and second tone frequency signals to mark and space signals respectively and being adapted for operative connection with telephone lines and a decoder, said coupler comprising a band-pass amplifier having a bandwidth which has a center frequency adjacent the first and second tone frequency signals, frequency selective means connected with the output of the amplifier and being tuned to one of said tone frequencies to produce a peak amplitude response at said one tone frequency and having a frequency response characteristic such that the amplitude response at the other tone frequency is approximately one-half the peak response, an amplitude discriminator operatively connected with said frequency selective means and having a first conductive state when the output thereof is less than a predetermined amplitude and a second conductive state when the output of the selective means is greater than said predetermined amplitude, said predetermined amplitude corresponding to a value intermediate said peak and said reduced amplitudes for the first and second tone frequency signals, and a decoder driver connected with the amplitude discriminator and operable to produce a mark signal when the discriminator is in its first conductive state and operable to produce a space signal when the discriminator is in its second conductive state and means connected to the output of the frequency selective means and responsive to the absence of a signal for maintaining the decoder driver in a condition which is the same as that produced by one of the first or second conductive states of said discriminator.

2. The coupler defined in claim 1, wherein said amplitude discriminator is operatively connected with said frequency selective means by a detector connected with the frequency selective means for rectifying and filtering the output thereof to produce a detected signal having an amplitude corresponding to the frequency of the first and second tone frequency signals, the output of said detector being connected with the input of said amplitude discriminator.

3. The coupler defined in claim 1 wherein the band-pass amplifier includes a negative feedback path, frequency selective means in the feedback path adapted to pass frequencies below the first tone frequency and above the second tone frequency.

4. For use in a data communication system wherein data signals are transmitted as tone frequency signals over telephone lines to a decoder adapted to respond to mark and space signals in the form of direct current impulses, a coupler for converting first and second tone frequency signals to mark and space signals respectively and being adapted for operative connection with telephone lines and a decoder, a band-pass amplifier having a bandwidth which has a center frequency adjacent the first and second tone frequency signals, frequency selective means connected with the output of the amplifier and producing a peak amplitude response at one tone frequency and a reduced amplitude response at the other tone frequency, an amplitude discriminator operatively connected with said frequency selective means and having a first conductive state when the output thereof is less than a predetermined amplitude and a second conductive state when the output of the selective means is greater than said predetermined amplitude, said predetermined amplitude corresponding to a value intermediate said peak and said reduced amplitudes for the first and second tone frequency signals, and a decoder driver connected with the amplitude discriminator and operable to produce a mark signal when the discriminator is in its first conductive state and operable to produce a space signal when the discriminator is in its second conductive state, said band-pass amplifier including an automatic gain control circuit responsive to a voltage above a threshold value for increasing the gain of the amplifier when the amplifier output is above the threshold value and below a predetermined value and for decreasing the gain of the amplifier when the amplifier output is above said predetermined value, said automatic gain control circuit being nonresponsive to an amplifier output below the threshold value whereby the rejection of frequencies outside the bandpass of the amplifier is enhanced by the gain control.

5. The coupler as defined in claim 4 further including carrier responsive means having its input operatively connected with said frequency selective means, enabling means connected with said amplitude discriminator for rendering it effective to control the decoder driver when the enabling means is in a first state and ineffective to control the decoder driver when the enabling means is in a second state, said carrier responsive means having its output connected with said enabling means and adapted to switch it to the first state when a carrier is received.

6. In a data set coupler for converting first and second tone frequency signals to mark and space signals, amplifying means for said tone frequency signals, frequency selective means exhibiting resonance at one of said tone frequencies, means connected with said amplifying means for energizing the frequency selectivity means with constant amplitude current impulses of a frequency corresponding to either the first or second tone frequency whereby the voltage thereacross has an amplitude dependent upon the frequency of said impulses, and amplitude responsive means connected with the frequency selective means for producing output signals in accordance with the amplitude of the voltage applied thereto, said amplitude responsive means comprising first and second diodes with conductive paths having separate and common portions and bias means there for whereby the first diode conducts and the second diode is cut off when an input voltage on the first diode is less than a predetermined value and whereby the second diode conducts and the first diode is cut off when an input voltage on the first diode is greater than the predetermined value said predetermined value being intermediate the values of voltage output from the frequency selective means which correspond to mark and space signals, and means developing an output signal indicative of the conductive stage of one of said diodes.

7. The combination defined in claim 6 additionally including switching means connected with the output of the amplitude responsive means, said switching means comprising first and second transistors, the first transistor having its input effectively connected with said second diode and its output connected to the input of the second transistor, the second transistor having its output adapted for connection to utilization means with the output representing a mark signal in a first conductive state and representing a space signal in a second conductive state, said transistors being maintained in opposite conductive states, said first transistor being maintained in the second conductive state when the output of the amplitude responsive means is indicative of either a mark signal or the absence of a carrier, whereby the second transistor is in the first conductive state for either a mark signal or the absence of a carrier.

8. The combination defined in claim 7 further including a mark signal detecting circuit with enabling means connected with the second transistor for changing the bias thereon between first and second bias levels when a carrier is received whereby the output of the first transistor in its first conductive state is effective to switch the second transistor to its second conductive state to indicate the receipt of a space signal.

9. The combination defined in claim 8 wherein the amplitude responsive means is operatively connected with the frequency selective means by a detector for rectifying and filtering the output thereof to produce a detected signal, the output of the detector being applied to the first diode in the amplitude responsive means.

10. In a data set coupler for converting first and second tone frequency signals to mark and space signals, a band-pass amplifier having a bandwidth which has a center frequency intermediate the first and second tone frequency signals, a negative feedback path including frequency selective means adapted to reject the first and second tone frequencies and to pass frequencies below the first tone frequency and above the second tone frequency whereby the pass band of the amplifier includes the first and second tone frequencies, an automatic gain control circuit connected to the amplifier output and responsive to a voltage above a threshold value for controlling the gain of the amplifier, frequency selective means connected with the output of the amplifier and producing an output having an amplitude corresponding to the frequency of the amplifier output, and amplitude responsive means connected with the frequency selective means for producing output signals corresponding to the amplitude of the voltage applied thereto wherein the amplitude responsive means comprises first and second diodes with conductive paths having separate and common portions and bias means therefor whereby the first diode conducts and the second diode is cut off when an input voltage on the first diode is less than a predetermined value and whereby the second diode conducts and the first diode is cut off when an input voltage on the first diode is greater than the predetermined value, said predetermined value being intermediate the values of voltage output from the frequency selective means which correspond to mark and space signals, and means developing an output signal indicative of the conductive state of one of said diodes.

11. The combination defined in claim 10 additionally including switching means connected with the output of the amplitude responsive means, said switching means comprising first and second transistors; the first transistor having its input effectively connected with said second diode and its output connected to the input of the second transistor, the second transistor having its output adapted for connection to utilization means with the output representing a mark signal in the first conductive state and representing a space signal in a second conductive state, said transistors being maintained in opposite conductive states, said first transistor being maintained in the second conductive state when the output of the amplitude responsive means is indicative of either a mark signal or the absence of a carrier, whereby the second transistor is in the first conductive state for either a mark signal or the absence of a carrier.

12. The combination defined in claim 11 further including a mark signal detecting circuit with enabling means connected with the second transistor for changing the bias thereon between first and second bias levels when a carrier is received whereby the output of the first transistor in its first conductive state is effective to switch the second transistor to its second conductive state to indicate the receipt of a space signal.

13. For use in data communication system wherein data signals are transmitted as tone frequency signals over telephone lines to a decoder adapted to respond to mark and space signals in the form of direct current impulses, a coupler for converting first and second tone frequency signals to mark and space signals respectively and being adapted for operative connection with telephone lines and a decoder, a band-pass amplifier having a bandwidth which is centered between the first and second tone frequency signals, a frequency selective network connected with the output of the amplifier and including a parallel resonant circuit tuned to the second tone frequency signal and producing a peak amplitude response at the second tone frequency and a reduced amplitude response at the first tone frequency, a detector connected with the frequency selective network for rectifying and filtering the output thereof to produce a detected signal having an amplitude corresponding to the frequency of the first and second tone frequency signals, an amplitude discriminator connected with the detector and having a first conductive state when the detected signal is less than a predetermined amplitude and a second conductive state when the detected signal is greater than said predetermined amplitude said predetermined amplitude corresponding to value intermediate the detected signal amplitudes for the first and second tone frequency signals, and a decoder driver connected with the amplitude discriminator and operable to produce a mark signal when the discriminator is in its first conductive state and operable to produce a space signal when the discriminator is in its second conductive state and a mark-detecting circuit connected with the output of the frequency selective network and responsive to the absence of a signal for maintaining the decoder driver in a condition which is the same as that produced by the first conductive state of said discriminator.